(12) United States Patent
McBride et al.

(10) Patent No.: US 10,572,401 B2
(45) Date of Patent: Feb. 25, 2020

(54) DIRECT MEMORY ACCESS DESCRIPTOR PROCESSING USING TIMESTAMPS

(71) Applicant: Microsoft Technology Licensing, LLC, Redmond, WA (US)

(72) Inventors: Chad McBride, North Bend, WA (US); Jeffrey Bradford, Woodinville, WA (US); Steven Wheeler, North Bend, WA (US); Christopher Johnson, Snoqualmie, WA (US); Boris Bobrov, Kirkland, WA (US); Andras Tantos, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 49 days.

(21) Appl. No.: 15/651,235

(22) Filed: Jul. 17, 2017

(65) Prior Publication Data

US 2017/0315939 A1 Nov. 2, 2017

Related U.S. Application Data

(62) Division of application No. 14/671,811, filed on Mar. 27, 2015, now Pat. No. 9,175,464.

(51) Int. Cl.
| | |
|---|---|
| *G06F 13/28* | (2006.01) |
| *G06F 13/00* | (2006.01) |
| *G06F 13/38* | (2006.01) |
| *G06F 13/16* | (2006.01) |
| *G06F 13/40* | (2006.01) |
| *G06F 13/42* | (2006.01) |

(52) U.S. Cl.
CPC .......... *G06F 13/1642* (2013.01); *G06F 13/28* (2013.01); *G06F 13/4068* (2013.01); *G06F 13/42* (2013.01)

(58) Field of Classification Search
CPC .......... G06F 13/28; G06F 13/00; G06F 13/38
See application file for complete search history.

(56) References Cited

U.S. PATENT DOCUMENTS

| | | | |
|---|---|---|---|
| 5,644,784 | A | 7/1997 | Peek |
| 5,828,901 | A | 10/1998 | O'Toole et al. |
| 6,370,625 | B1 | 4/2002 | Carmean et al. |
| 7,177,988 | B2 | 2/2007 | Efland et al. |
| 7,620,748 | B1 | 11/2009 | Bruce |

(Continued)

FOREIGN PATENT DOCUMENTS

| | | |
|---|---|---|
| CN | 101031897 A | 9/2007 |
| GB | 2459939 A | 11/2009 |

OTHER PUBLICATIONS

Rossi, et al., "Ultra-Low-Latency Lightweight DMA for Tightly Coupled Multi-Core Clusters", In Proceedings of the 11th ACM Conference on Computing Frontiers, May 20, 2014, 10 pages.

(Continued)

*Primary Examiner* — David E Martinez
(74) *Attorney, Agent, or Firm* — Mark K. Young; Mayer & Williams PC

(57) ABSTRACT

Hardware accelerated synchronization of data movement across multiple direct memory access (DMA) engines is provided using techniques in which the order of descriptor processing is guaranteed for scenarios involving a single CPU and multiple DMA engines as well as those involving multiple CPUs and multiple DMA engines.

19 Claims, 9 Drawing Sheets

(56) References Cited

U.S. PATENT DOCUMENTS

| | | |
|---|---|---|
| 2004/0024925 A1 | 2/2004 | Cypher et al. |
| 2006/0004931 A1* | 1/2006 | Weatherspoon ........ G06F 13/28 710/22 |
| 2006/0015652 A1* | 1/2006 | Day ........................ G06F 13/28 710/5 |
| 2006/0161694 A1 | 7/2006 | Tomozaki et al. |
| 2007/0073925 A1 | 3/2007 | Lim et al. |
| 2008/0109569 A1 | 5/2008 | Leonard et al. |
| 2009/0006672 A1 | 1/2009 | Blumrich et al. |
| 2011/0179199 A1 | 7/2011 | Chen et al. |
| 2011/0191507 A1 | 8/2011 | Bond et al. |
| 2011/0258281 A1 | 10/2011 | Archer et al. |
| 2012/0117281 A1 | 5/2012 | Blocksome et al. |
| 2014/0095737 A1 | 4/2014 | Paragaonkar |
| 2014/0149625 A1 | 5/2014 | Sharifie et al. |
| 2015/0032914 A1 | 1/2015 | Brewerton et al. |

OTHER PUBLICATIONS

Vujic, et al., "DMA-Circular: An Enhanced High Level Programmable DMA Controller for Optimized Management of On-chip Local Memories", In Proceedings of the 9th Conference on Computing Frontiers, May 15, 2012, 10 pages.

International Search Report and Written Opinion Issued in PCT Application No. PCT/US2016/020311, dated Sep. 28, 2016, 19 Pages.

"First Office Action and Search Report Issued in Chinese Patent Application No. 201680018005.4", dated Aug. 21, 2019, 11 Pages.

"Non Final Office Action Issued in U.S. Appl. No. 15/651,319", dated Mar. 29, 2019, 12 Pages.

* cited by examiner

DIRECT MEMORY ACCESS DESCRIPTOR PROCESSING USING TIMESTAMPS

CROSS REFERENCE TO RELATED APPLICATIONS

This application is a divisional of U.S. Ser. No. 14/671,811, filed Mar. 27, 2015, now U.S. Pat. No. 9,715,464 issued Jul. 25, 2017, entitled, "DIRECT MEMORY ACCESS DESCRIPTOR PROCESSING", which is incorporated herein by reference in its entirety.

BACKGROUND

In modern system-on-chip (SoC) designs multiple central processing units (CPUs) are commonly used on a single silicon chip for processing data from different sources.

SUMMARY

Hardware-accelerated synchronization of data movement across multiple direct memory access (DMA) engines is provided using techniques in which the order of descriptor processing is coordinated for scenarios involving a single CPU and multiple DMA engines as well as those involving multiple CPUs and multiple DMA engines. The present descriptor processing can increase the efficiency of data movement between memories and other components in a system to reduce cross-CPU data movement and supervisory overhead while also enabling a CPU to enqueue a descriptor for processing with any available DMA engine when other engines are busy with large data movements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
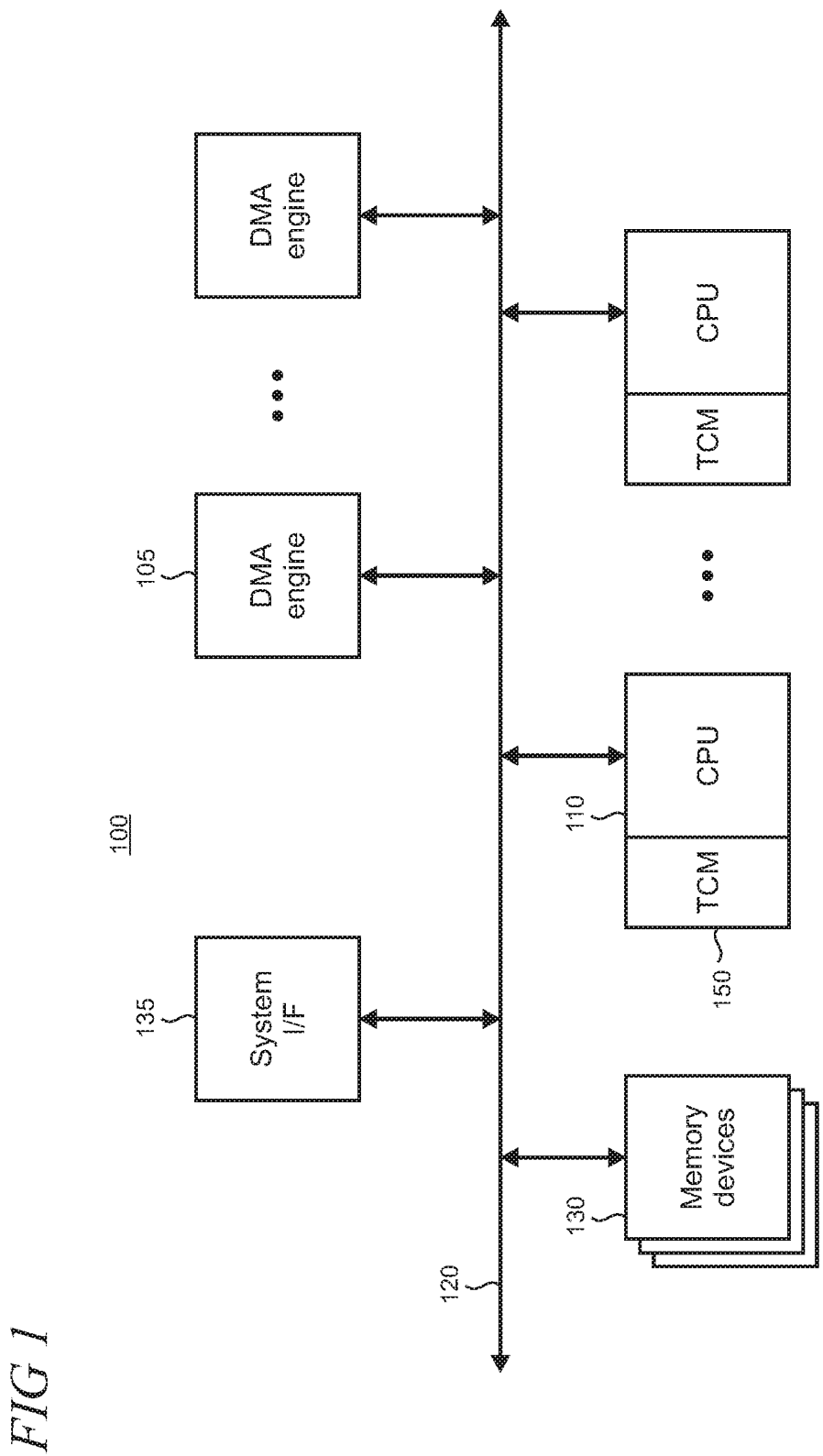
FIG. 1 shows an illustrative system in which multiple DMA engines interoperate with one or more CPUs through an interconnect.

FIG. 1 shows an illustrative system 100 in which multiple DMA engines (representatively indicated by reference numeral 105) interoperate with one or more CPUs 110 through an interconnect 120. The interconnect 120 generally operates at a chip level, but may include interconnects among processors, caches, memory, peripheral components (e.g., PCIe—Peripheral Component Interconnect Express), or the like, and may be implemented within a single chip in some cases, or may support connectivity among multiple chips in others. The interconnect 120 is not limited to a specific protocol or topology, and may include, by way of example and without any limitation, a bus, point-to-point, circuit-switched, crossbar, packet-based, or network-on-a-chip arrangements, or combinations thereof. System 100 is typically implemented in hardware using various integrated circuits in system-on-chip (SoC) or embedded system architectures. For example, system 100 (including the DMA engines 105 and their constituent components) may be implemented using one or more field programmable gate arrays (FPGAs) having configurable logic blocks (CLBs) that are arranged to enable the system 100 to perform its as-designed functions. Each CLB typically includes a configurable input switching matrix, selection circuitry such as a multiplexer (mux), and flip-flop (i.e., latch) circuits. The interconnect 120 may also support connectivity to various memory devices 130 and system interfaces 135. One or more of the CPUs 110 may be associated with a tightly coupled memory (TCM) 150, as shown.

Figure 2:
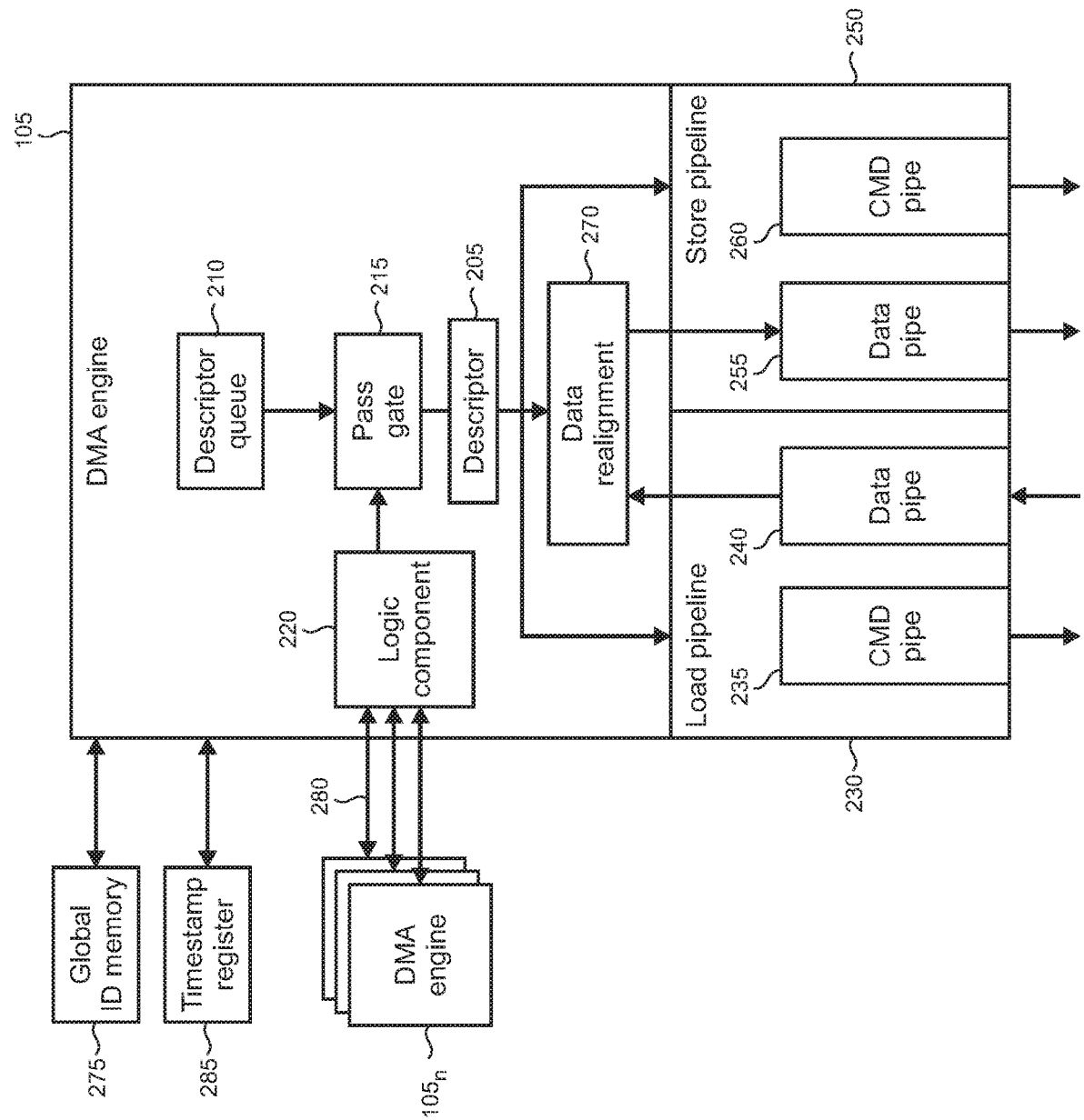
FIG. 2 is a simplified functional block diagram of an illustrative DMA engine.

FIG. 2 is a simplified functional block diagram of an illustrative DMA engine 105. The DMA engine 105 moves blocks of data from a source to a destination address autonomously from control by the CPU. A given transfer is configured using a descriptor 205 that generally includes the source address, destination address, control parameters, and other information in some cases (specific descriptor fields are described in the illustrative example below). The descriptors are locally stored in a queue 210 and passed through a gate 215 under the control of locally-implemented logic 220 to load and store pipelines 230 and 250 which include respective command pipes 235 and 260 and data pipes 240 and 255. A given descriptor can be fenced by setting a fence bit so that all descriptors that precede it are processed before the fenced descriptor is processed.

The DMA engine 105 can perform data realignment 270 through the data pipes to allow reads and writes that are independent of byte offset on a page of memory. The local logic 220 is operatively coupled to logic implemented in other DMA engines 105 in the system 100 using connections to the interconnect 120 (connections are representatively indicated by reference numeral 280). However, the decision logic for unblocking a fenced descriptor resides fully in the DMA engine where the fenced descriptor resides. Non-fenced DMA engines do not need to know that a fenced DMA engine is waiting for them to complete their processing. The DMA engine 105 may also be operatively coupled to a global ID memory 275 and a timestamp register 285.

In some implementations, the logic 220 can be controlled with software using an MMIO (memory mapped input/output) register or other suitable interface components. Thus, for example, the software can be used to cancel a fenced descriptor.

Figure 3:
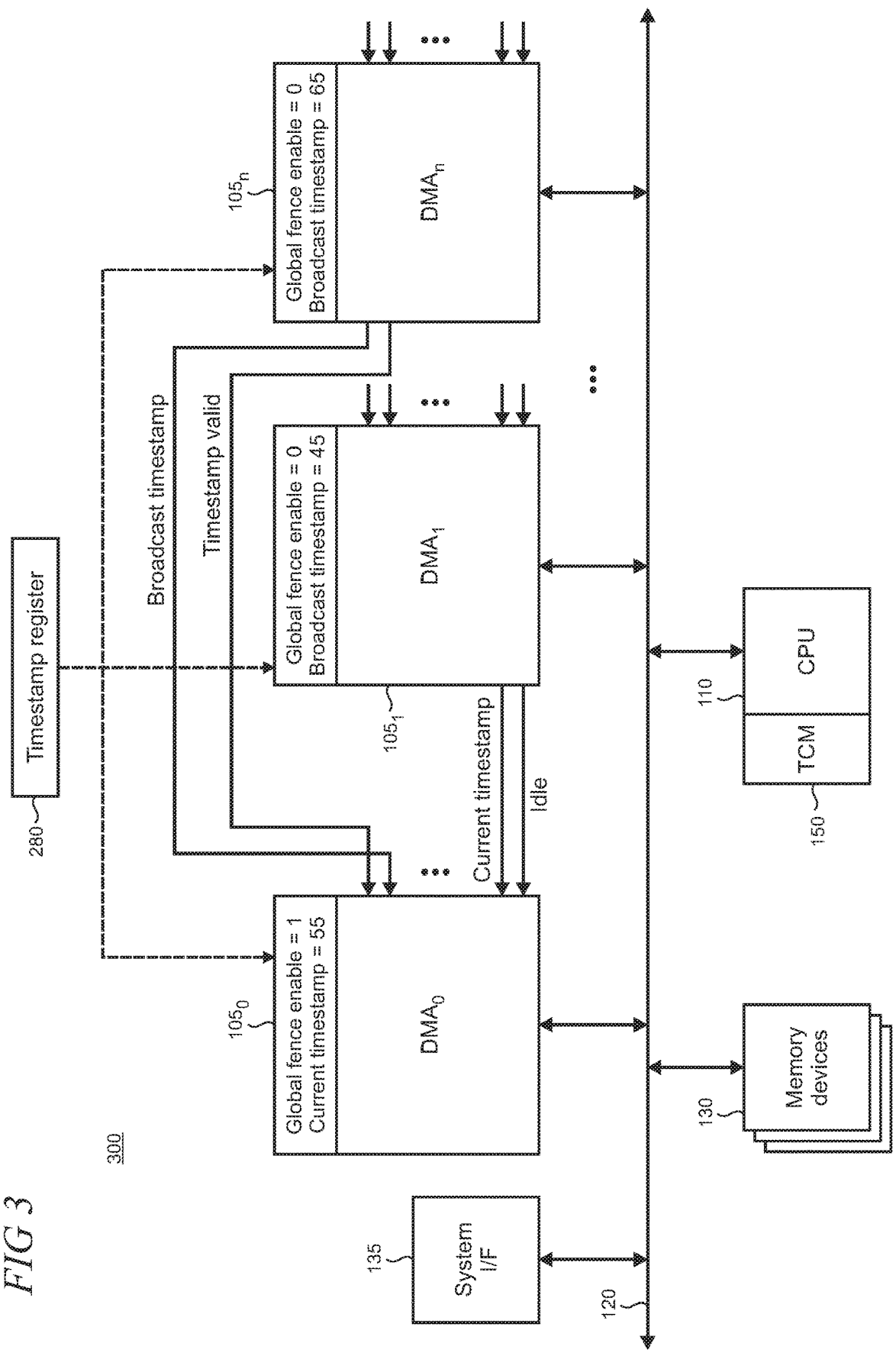
FIG. 3 shows an illustrative example of descriptor processing in a system that includes a single CPU and multiple DMA engines using timestamp tracking and broadcasting.
Figure 4:
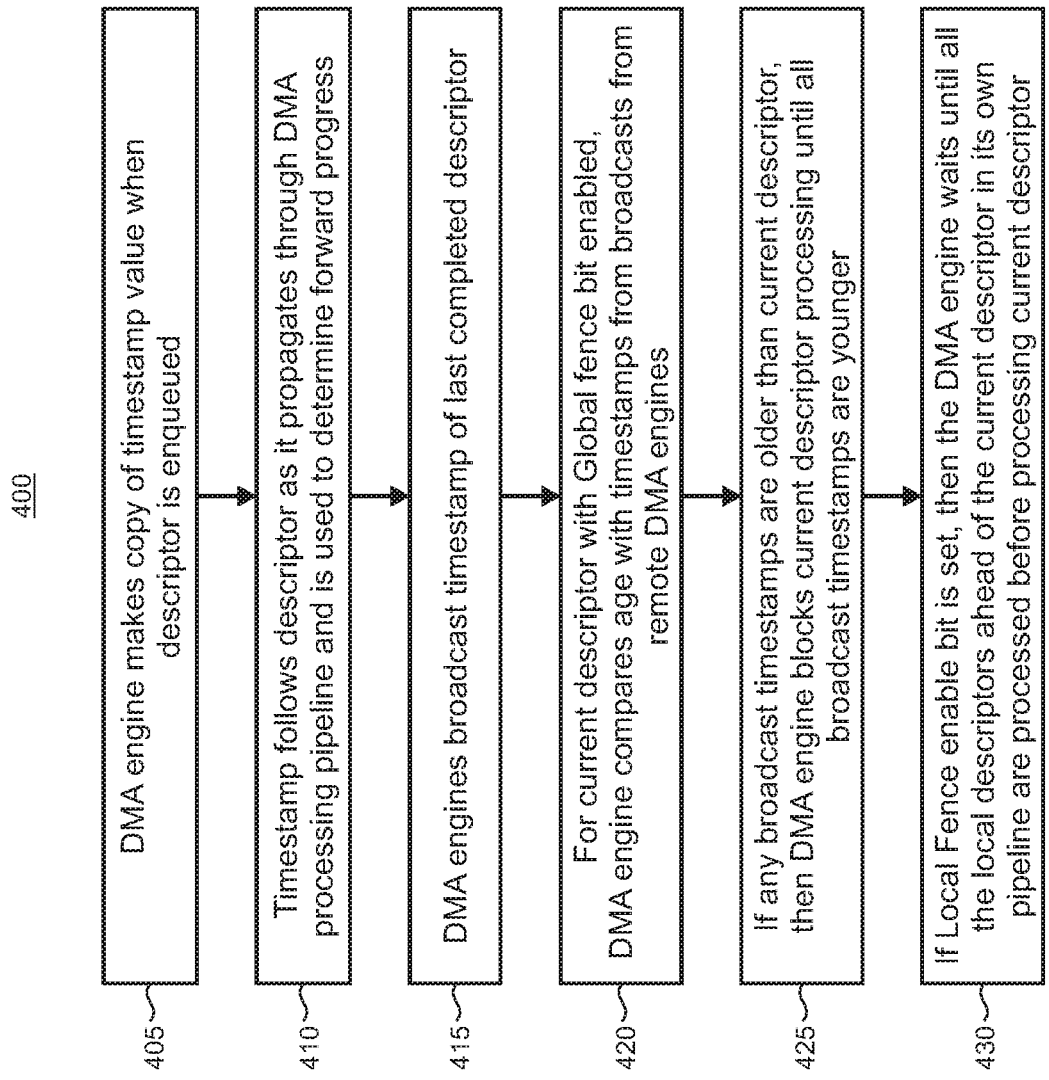
FIG. 4 is a flowchart of an illustrative method for descriptor processing using the system shown in FIG. 3.

FIG. 3 shows an illustrative example of descriptor processing using a system 300 that includes a single CPU 110 and multiple DMA engines $105_{0-n}$. FIG. 4 is a flowchart of an illustrative method 400 for descriptor processing using timestamp tracking and broadcasting that may be implemented with the system 300 shown in FIG. 3. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In block 405, when a descriptor is enqueued to any DMA engine 105 in the system 100, the DMA engine 105 makes a copy of the value in the timestamp register 285 to mark the age of the descriptor. The timestamp is stored with the descriptor when enqueued. The timestamp register 285 is typically sized to be sufficiently large to guarantee no collisions or timestamp reuse. The timestamp can be implemented as a cycle counter or as a global descriptor counter where typically the global descriptor counter needs fewer bits. The timestamp register 285 is configured to be unique to a given set of DMA engines and all DMA engines in the set utilize a consistent view of the timestamp register value.

In this particular example, the descriptor may include the following fields (one bit fields) in addition to its regular set of fields:

"Broadcast timestamp enable"—when set, the timestamp of the last completed descriptor is broadcast to all other DMA engines in the set. When not set, the DMA engine will broadcast a NULL value or some other predetermined value.

"Local fence enable"—when set, the DMA engine waits until all descriptors ahead of the current descriptor are completed before the current descriptor begins processing.

"Global fence enable"—when set, the DMA engine waits for descriptors older than it in the system 300 to be completed before it begins processing the current descriptor. This may be accomplished by waiting until all broadcast timestamps from other DMA engines are either broadcasting a NULL descriptor or a timestamp that is younger than the timestamp stored with the current descriptor.

"Broadcast while fence enabled"—when set, the DMA engine continues to broadcast the timestamp of the last processed descriptor even though the current descriptor is blocked. When not set, the DMA engine broadcasts a NULL descriptor.

In block 410, the timestamp follows the descriptor through the DMA engine processing pipeline (i.e., all of the individual DMA engine pipes as coupled through the interconnect) in the system 300. The timestamp is used to determine the forward progress of the descriptor. In block 415, each DMA engine 105 in the system 300 broadcasts the age of the last completed descriptor, using the timestamp, to the other individual DMA engines, or alternatively to a timestamp concentrator that decides when fenced descriptors are able to advance and be processed.

In block 420, when a descriptor is at the head of the queue 210 (FIG. 2) and is the current descriptor, and the Global fence enable bit is set, then the DMA engine compares the age of the current descriptor with the timestamps from the broadcasts. In block 425, if any broadcast timestamps are older than the age of the current descriptor, then the current descriptor processing is blocked (i.e., fenced) by the DMA engine until all the broadcast timestamps are younger. Applying a maximum count value, a dead-man timer may be utilized that counts the number of cycles that a descriptor has been fenced. If the maximum count value is reached then a fault isolation register (FIR) may be set which can be used to set an interrupt.

In block 430, if a Local fence enable bit is set, then the DMA engine waits until all the local descriptors ahead of the current descriptor in its own pipeline are processed before processing the current descriptor.

As shown in FIG. 3, $DMA_0$ is blocked from processing its current descriptor while waiting for $DMA_1$ to broadcast a descriptor having an older timestamp. $DMA_n$ is broadcasting a descriptor having a younger timestamp, so $DMA_0$ is not dependent on $DMA_n$ when determining when to process its current descriptor.

Figure 5:
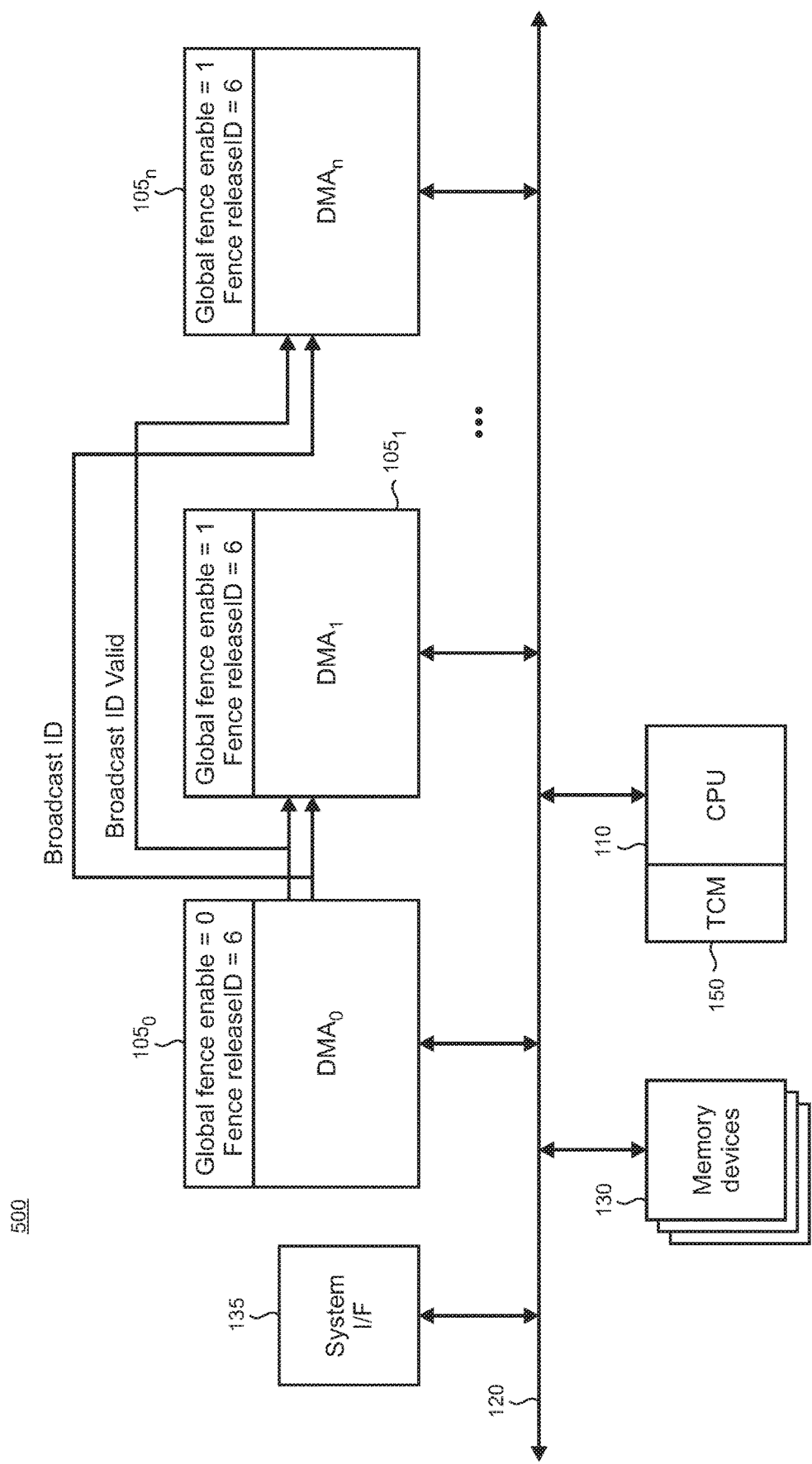
FIG. 5 shows an illustrative example of descriptor processing in a system that includes a single CPU and multiple DMA engines using an identifier (ID) fence and release.
Figure 6:
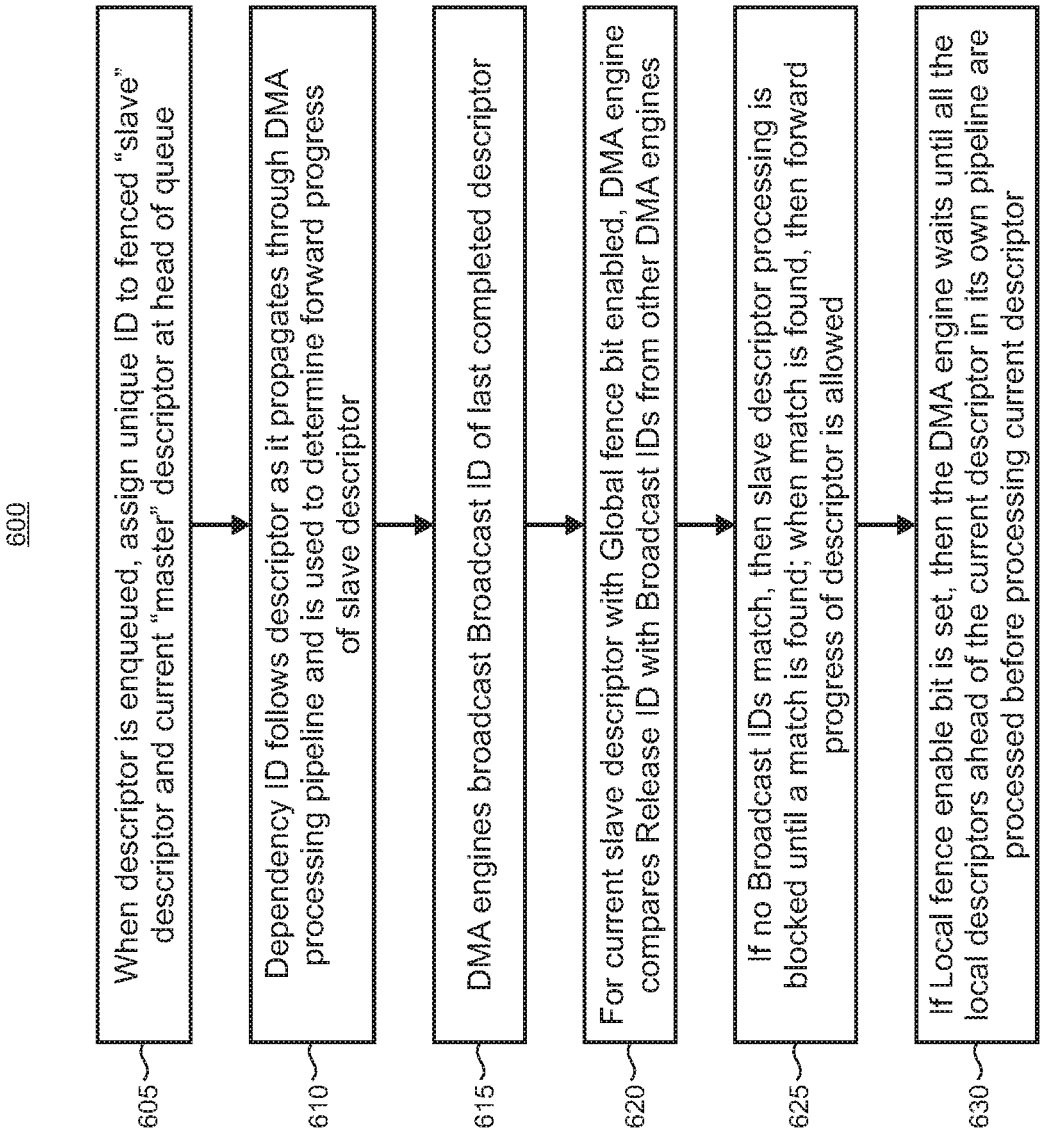
FIG. 6 is a flowchart of an illustrative method for descriptor processing using the system shown in FIG. 5.

FIG. 5 shows an illustrative example of descriptor processing in a system 500 that includes a single CPU 110 and multiple DMA engines $105_{0-n}$. FIG. 6 is a flowchart of an illustrative method 600 for descriptor processing using an identifier (ID) fence and release that may be implemented with the system 500 shown in FIG. 5. This method uses a dependency pairing between two specific descriptors in which each descriptor resides on a different DMA engine. The method is therefore different from the one described above (method 400 shown in FIG. 4) in which a dependency set is utilized between a single descriptor and all the descriptors having older timestamps in the system.

In block 605 in FIG. 6, when a descriptor is enqueued, a unique ID is assigned to a descriptor being fenced (termed a "slave") and the same ID is assigned to the current descriptor awaiting processing at the head of the queue (termed the "master"). In this method, the slave descriptor waits for processing until the master descriptor has completed processing and is thus dependent on the master. The dependency ID is stored in a Fence release ID field of the descriptor for the slave and in a Broadcast ID field for the master. The dependency pairing between the slave and master descriptors in the same DMA engine queue can create a similar effect to the local fence in the example above, but with an added advantage that a blocked descriptor can start processing when the descriptor in the store pipeline 250 (FIG. 2) finishes, instead of waiting for the descriptors in both the load pipeline 230 and store pipeline 250 to finish. For example C, B, and A are descriptors in the same queue in which A is the oldest entry and at the head of the queue and C has a dependency on A (i.e., C is the slave and A is the master). Descriptor C can begin processing as soon as A leaves the store pipeline, instead of waiting for both A and B to leave the store pipeline before C can begin processing as would be the case in the previous method described above.

Dependencies can extend across multiple DMA engines and a set of dependencies includes all the descriptors in the system that share the same dependency ID. Thus, a single descriptor can support multiple dependencies. A dependency window spans a time frame between the enqueueing of a first descriptor in the dependency set and the completion of processing of all descriptors that form a dependency set. Software running on the system 500 may be utilized to ensure that dependency IDs are not reused for different dependency sets of descriptors within the same dependency window. The software can also ensure that dependency ID assignment does not generate a dependency loop. For example, assigning descriptor A to be dependent on descriptor B using ID=6 while also assigning B to be dependent of A would not be allowed by the software.

In this example, the descriptors may include the following fields in addition to their regular set of descriptor fields:

"Broadcast ID enable"—when set, the ID of the last completed descriptor is broadcast to all other DMA engines in the dependency set. When not set, the DMA engine will broadcast a NULL value or some other predetermined value.

"Broadcast ID"—this is a dependency ID that the DMA engine will broadcast to all other DMA engines when the current descriptor has completed processing.

"Local fence enable"—when set, the DMA engine waits for all descriptors ahead of the current descriptor to be completed before the current descriptor begins processing.

"Global fence enable"—when set, the DMA engine will block the descriptor and all descriptors behind it in the queue until one of the broadcasting DMA engines provides the dependency ID that the descriptor is waiting for. When the matching dependency ID is received from one of the broadcasting DMA engines, then the fenced descriptor can begin its processing.

"Fence release ID"—when the "Global fence enable" bit is set, the value of this field is used to compare against the values being provided by other DMA engines in the system. When a match is found, then the current fenced descriptor can begin its processing.

Continuing with the description of the flowchart in FIG. 6, in block 610, the dependency ID follows the descriptor through the DMA pipeline and is used to determine the forward progress of the slave descriptor. In block 615, each DMA engine in the system 500 broadcasts its Broadcast ID to the other individual DMA engines. Broadcasting may be implemented using a handshake or as a direct feed. Direct feed can often be advantageously utilized because it can reduce overhead associated with broadcast receipt from multiple DMA engines. A valid signal will typically accompany the Broadcast ID to inform the consuming DMA engine that it is safe to use the Broadcast ID. In alternative implementations, the Broadcast ID may be sent to an ID concentrator that decides when fenced descriptors are able to advance. This functionality may be controlled, for example, using software through an MMIO register.

In block 620, when a slave descriptor reaches the head of the queue and becomes the current descriptor, the DMA engine compares its Release ID to the Broadcast IDs from all of the other DMA engines in the system. In block 625, if none of the Broadcast IDs match the slave's "Release ID", then that slave's descriptor is blocked (fenced) until a match is found. Applying a maximum count value, a dead-man timer may be utilized that counts the number of cycles that a descriptor has been fenced. If the maximum count value is reached, then a fault isolation register (FIR) may be set which can be used to set an interrupt. Deadlock detection may also be utilized by observing when all DMA engines having descriptors in a dependency set are blocked. For example, software can release a fence from all blocked DMA engines by writing a descriptor with Remote release ID bit set and the Remote release bit set. When this descriptor is processed, the remote DMA engine will broadcast the Remote release ID and a valid bit to all the DMA engines in the system being synchronized. When a match is found between the slave's Release ID and a Broadcast ID, then the slave descriptor is allowed to make forward progress in the system.

In block 630, if a Local fence enable bit is set, then the DMA engine waits until all the local descriptors ahead of the current descriptor in its own pipeline are processed before processing the current descriptor.

As shown in FIG. 5, $DMA_0$ releases the fence for queued descriptor in $DMA_1$ and $DMA_n$ by broadcasting an ID=6 which is the dependency ID set in their Fence release ID fields.

Figure 7:
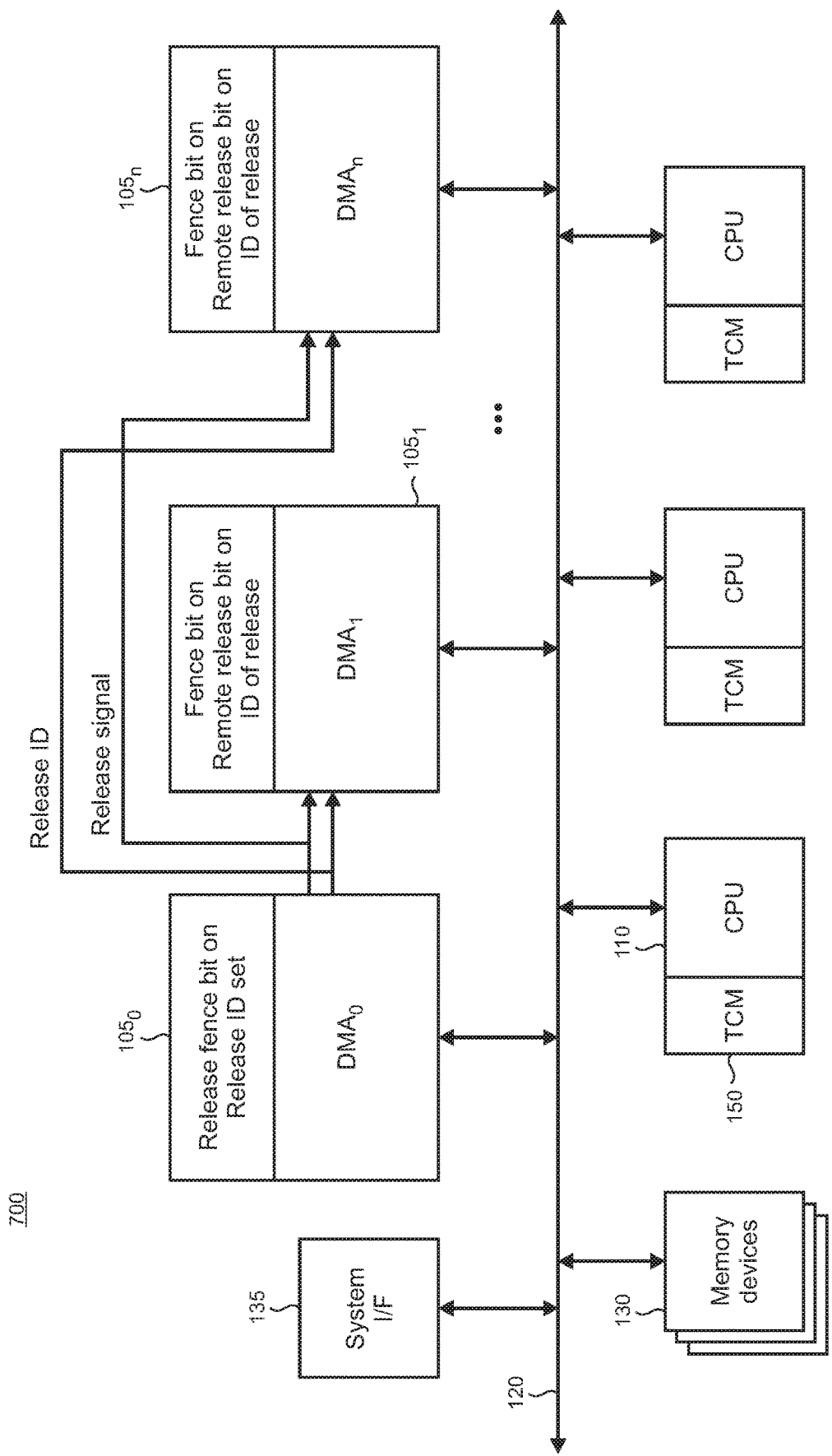
FIG. 7 shows an illustrative example of descriptor processing in a system including multiple CPUs and multiple DMA engines using a lock and clear handshake.
Figure 8:
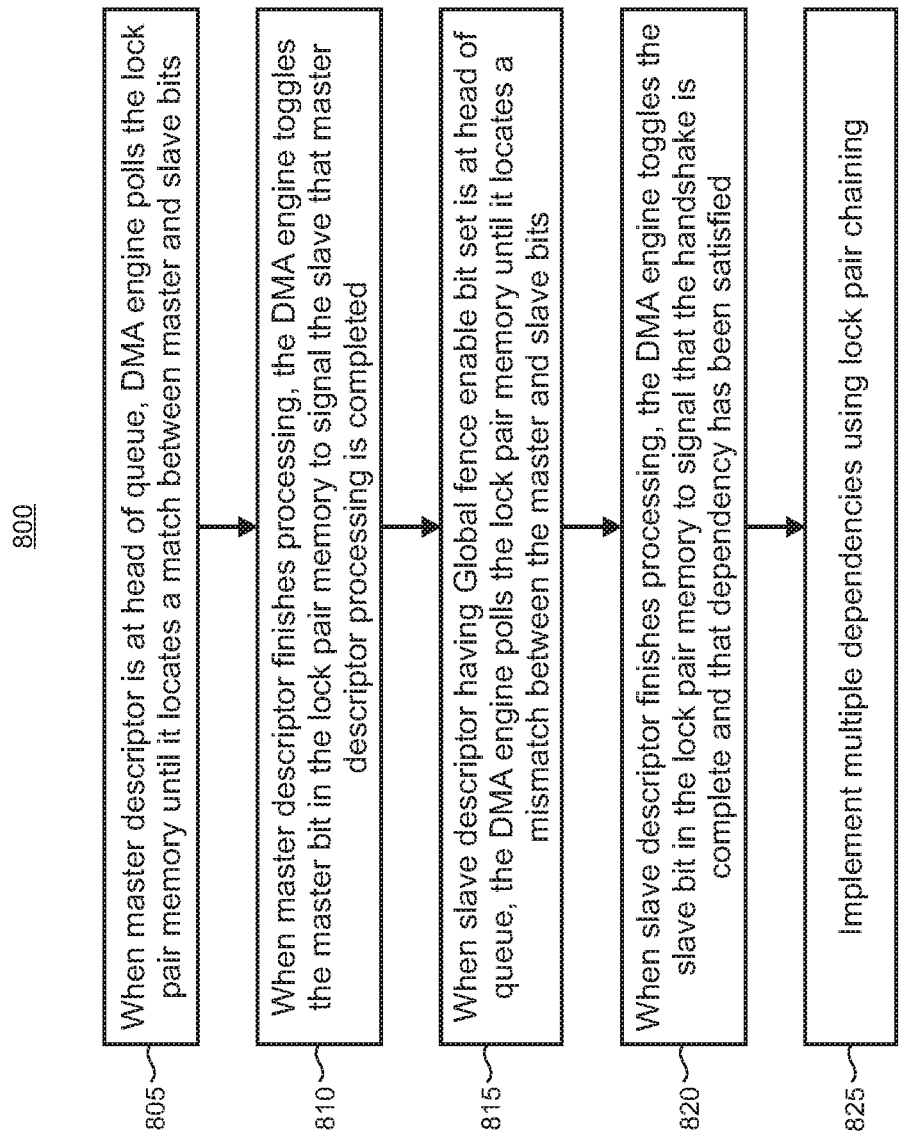
FIG. 8 is a flowchart of an illustrative method for descriptor processing using the system shown in FIG. 7.

FIG. 7 shows an illustrative example of descriptor processing using a system 700 that includes multiple CPUs 110 and multiple DMA engines $105_{0-n}$. FIG. 8 is a flowchart of an illustrative method for descriptor processing using a lock and clear handshake that may be implemented with the system 700.

This descriptor processing example also uses descriptors that are arranged in dependency pairs in a similar manner to the previous example. However, in systems that use multiple CPUs, descriptors can be generated from any CPU and target any DMA engine. Deadlock scenarios can occur in which the master descriptor is processed before the slave descriptor is enqueued so that the dependency is missed altogether. This can cause the slave descriptor to wait for an event that will not occur (i.e., a deadlock).

The present solution uses a handshake memory termed a lock pair memory that can store handshake bits among multiple descriptors that have a common dependency (e.g., master and slave descriptors). The lock pair memory may be implemented using a flop-based memory, a logical partition, an SRAM (static ram), ROM (read-only memory), FLASH memory, cache memory, LPRA (low power register array), or main memory. Flop-based memory can be advantageously utilized in some implementations so that individual bits can be read and written in parallel every cycle.

In this example, the descriptors may include the following fields in addition to their regular set of descriptor fields:

"Dependency pair enable"—when set, the descriptor is part of a dependency pair and is either a master descriptor or a slave descriptor.

"Master enable"—when set, the descriptor is a master descriptor and has dependent slave descriptors waiting for it to complete. When not set, the descriptor is a slave descriptor and waits for its master descriptor to complete before it can begin being processed. The slave functionality is only enabled if the "global fence enable" bit is asserted.

"Lock pair ID"—this is the dependency ID that may be assigned by software to the dependency pair. Software may be utilized to allocate IDs and ensure that IDs are not reused. The size of a given lock pair memory will typically determine the number of dependency pairs that can be concurrently used.

"Local fence enable"—when set, the DMA engine waits for all descriptors ahead of the current descriptor to be completed before the current descriptor begins processing.

"Global fence enable"—when set, the DMA engine blocks this descriptor and all descriptors behind it in the queue until the synchronizing toggle bits for the dependency pair match the setting required for a slave to make forward progress.

In block 805 of FIG. 8, when a master descriptor is at the head of the queue, the DMA engine polls the lock pair memory until it locates a match between the master and slave bits. A match indicates that all the previous master/ slave handshakes have been completed and a new one can begin. In block 810, when the processing of the master descriptor is completed, the DMA engine toggles the corresponding master bit in the lock pair memory to signal the slave that the master descriptor processing is completed. The Lock pair ID is indexed by the software.

In block 815, when a slave descriptor having its Global fence enable bit set is at the head of the queue, the DMA polls the lock pair memory until it locates a mismatch between the master and slave bits. A mismatch indicates that the master descriptor has completed processing for that particular dependency pair, and therefore the slave descriptor can begin processing. If the master/slave bits match, then the processing of the slave continues to be blocked until the DMA engine reads a mismatch from the lock pair memory.

In block 820, when the slave descriptor processing is completed, the slave bit is toggled in the lock pair memory to signal that the handshake is complete and the dependency between the master and slave descriptors is satisfied. The synchronization sequence used in this method begins in a default state for the lock pair in which neither the master nor slave bit are set, and follows a sequence in which the master descriptor toggles its lock pair memory bit first but cannot toggle again until the slave descriptor toggles its bit. Applying a maximum count value, a dead-man timer may be utilized that counts the number of cycles that a descriptor has been fenced. If the maximum count value is reached then a fault isolation register (FIR) may be set which can be used to set an interrupt. The lock pair values for the dead-man count are then reset to allow recovery.

In block 825, multiple dependencies can also be implemented using lock pair chaining. For example, when a second master descriptor with the same ID detects that the master bit and slave bit do not match, then the second master must fence until the previous dependency is satisfied. When a second slave descriptor with the same ID as a previous slave detects that the master bit and slave bit do match, then the second master must fence until the master on which it depends toggles the master bit. At this point the processing can proceed.

Figure 9:
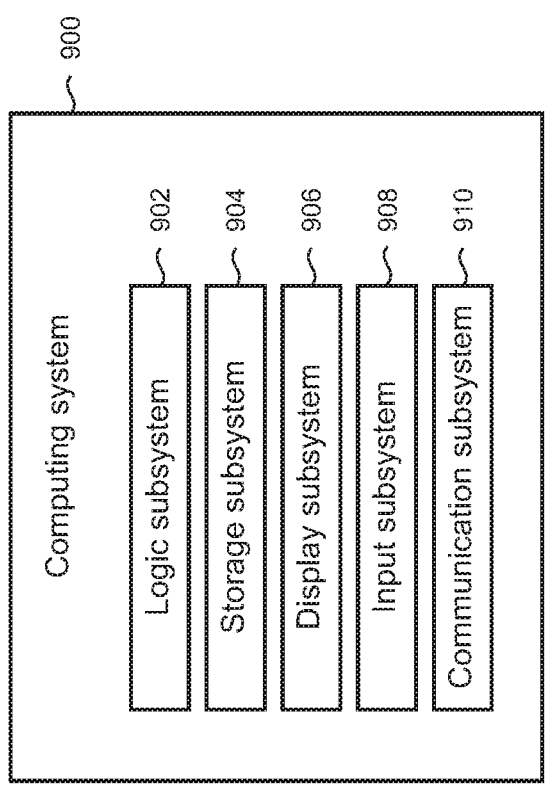
FIG. 9 shows an exemplary computing system.

FIG. 9 schematically shows a non-limiting embodiment of a computing system 900 that can be arranged to use systems applying the present DMA descriptor processing when implementing one or more of the configurations, arrangements, methods, or processes described above. The computing system 900 is shown in simplified form. It may be understood that virtually any computer architecture may be used without departing from the scope of the present arrangement. In different embodiments, computing system 900 may take the form of a display device, wearable computing device including head mounted display (HMD) device, mainframe computer, server computer, desktop computer, laptop computer, tablet computer, home-entertainment computer, network computing device, gaming device, mobile computing device, mobile communication device (e.g., smart phone), etc.

The computing system 900 includes a logic subsystem 902 and a storage subsystem 904. The computing system 900 may optionally include a display subsystem 906, an input subsystem 908, a communication subsystem 910, and/or other components not shown in FIG. 9.

The logic subsystem 902 includes one or more physical devices configured to execute instructions. For example, the logic subsystem 902 may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem 902 may include one or more processors configured to execute software instructions. Additionally or alternatively, the logic subsystem 902 may include one or more hardware or firmware logic machines configured to execute hardware or firmware instructions. The processors of the logic subsystem 902 may be single-core or multi-core, and the programs executed thereon may be configured for sequential, parallel, or distributed processing. The logic subsystem 902 may optionally include individual components that are distributed among two or more devices, which can be remotely located and/or configured for coordinated processing. Aspects of the logic subsystem 902 may be virtualized and executed by remotely accessible, networked computing devices configured in a cloud-computing configuration.

The storage subsystem 904 includes one or more physical devices configured to hold data and/or instructions executable by the logic subsystem 902 to implement the methods and processes described herein. When such methods and processes are implemented, the state of the storage subsystem 904 may be transformed—for example, to hold different data.

The storage subsystem 904 may include removable media and/or built-in devices. The storage subsystem 904 may include optical memory devices (e.g., CD (compact disc), DVD (digital versatile disc), HD-DVD (high definition DVD), Blu-ray disc, etc.), semiconductor memory devices (e.g., RAM (random access memory), ROM (read only memory), EPROM (erasable programmable ROM), EEPROM (electrically erasable ROM), etc.) and/or magnetic memory devices (e.g., hard-disk drive, floppy-disk drive, tape drive, MRAM (magneto-resistive RAM), etc.), among others. The storage subsystem 904 may include volatile, nonvolatile, dynamic, static, read/write, read-only, random-access, sequential-access, location-addressable, file-addressable, and/or content-addressable devices.

It may be appreciated that the storage subsystem 904 includes one or more physical devices, and excludes propagating signals per se. However, in some implementations, aspects of the instructions described herein may be propagated by a pure signal (e.g., an electromagnetic signal, an optical signal, etc.) using a communications medium, as opposed to being stored on a storage device. Furthermore, data and/or other forms of information pertaining to the present arrangement may be propagated by a pure signal.

In some embodiments, aspects of the logic subsystem 902 and of the storage subsystem 904 may be integrated together into one or more hardware-logic components through which the functionality described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

When included, the display subsystem 906 may be used to present a visual representation of data held by storage subsystem 904. This visual representation may take the form of a graphical user interface (GUI). As the present described methods and processes change the data held by the storage subsystem, and thus transform the state of the storage subsystem, the state of the display subsystem 906 may likewise be transformed to visually represent changes in the underlying data. The display subsystem 906 may include one or more display devices utilizing virtually any type of technology. Such display devices may be combined with logic subsystem 902 and/or storage subsystem 904 in a shared enclosure in some cases, or such display devices may be peripheral display devices in others.

When included, the input subsystem 908 may include or interface with one or more user-input devices such as a keyboard, mouse, touch screen, or game controller. In some embodiments, the input subsystem may include or interface with selected natural user input (NUI) components. Such components may be integrated or peripheral, and the transduction and/or processing of input actions may be handled on- or off-board. Exemplary NUI components may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing components for assessing brain activity.

When included, the communication subsystem 910 may be configured to communicatively couple the computing system 900 with one or more other computing devices. The communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices using a network such as the Internet.

Various exemplary embodiments of the present direct memory access descriptor processing are now presented by way of illustration and not as an exhaustive list of all embodiments. An example includes a direct memory access (DMA) engine, comprising: one or more connections to an interconnect supporting components including a central processing unit (CPU), one or more memory devices, and one or more remote DMA engines; a descriptor queue for queuing descriptors that specify DMA data movement to occur among components over the interconnect; and a logic component configured to cause the DMA engine to perform a method comprising broadcasting a timestamp associated with a current descriptor to each of the remote DMA engines, the current descriptor being at a head of the descriptor queue, receiving timestamps associated with other descriptors from the remote DMA engines, comparing the timestamp of the current descriptor with the received timestamps from the remote DMA engines, and processing the current descriptor when the received timestamps all have ages that are younger than an age of the timestamp of the current descriptor.

In another example, the timestamps are maintained in a register that provides timestamps that are unique to a set of DMA engines. In another example, the logic component is configured to fence the current descriptor when the timestamp of the current descriptor corresponds to a time more recent than any other received timestamps. In another example, the logic component is configured to set a maximum count value for a number of cycles that a descriptor has been fenced without being processed and to set an interrupt when the maximum count is reached. In another example, the logic component is configured to control the broadcasting using an MMIO (memory mapped input/output) register. In another example, the logic component is configured to locate a descriptor with a field that includes a global fence enable bit, and configured to fence the current descriptor only when its global fence enable bit is set. In another example, the logic component is configured to send a null descriptor when a current descriptor is fenced.

A further example includes a system, comprising: an interconnect; a central processing unit connected to the interconnect; one or more memory devices connected to the interconnect; a plurality of direct memory access (DMA) engines, each of the DMA engines connected to the interconnect, and including a logic component operable to implement a method comprising assigning an identifier (ID) to a slave descriptor being fenced and a master descriptor that is currently awaiting processing by a DMA engine, each descriptor including fields of information for facilitating data movement in the system, the assigned ID included in a fence release field of the slave descriptor and the assigned ID included in a broadcast ID field of the master descriptor, broadcasting a broadcast ID associated with a last completed descriptor to each of the plurality of DMA engines, comparing a release ID of a slave descriptor awaiting processing with each of the broadcast IDs received from the plurality of DMA engines.

In another example, the logic component is operable to receive broadcast IDs from the plurality of DMA engines. In another example, the logic component is operable to implement deadlock detection and release a fence when deadlock is detected. In another example, the system further includes a register configured for canceling a fenced descriptor. In another example, the logic component is operable to examine a descriptor for enablement of a local fence bit and to wait to process a current descriptor in a local queue until all descriptors preceding the current descriptor are processed. In another example, the system further includes a software component for assigning the ID, the software ensuring that a dependency loop is not created. In another example, the system is implemented as a system-on-chip or embedded system.

A further example includes a method performed by a direct memory access (DMA) engine disposed in a system having components that include a plurality of central processing units (CPUs), one or more memory devices, one or more remote DMA engines, and an interconnect that provides interconnections among the components, the method comprising: creating a dependency pairing between descriptors in the system, the descriptors describing DMA-facilitated data movement among components over the interconnect, the dependencies being between one or more master descriptors and one or more slave descriptors; when a master descriptor is next in a queue for processing, polling a memory that stores handshake bits between master descriptors and slave descriptors, the handshake bits including a master bit configured for toggling by a master descriptor and a slave bit configured for toggling by a slave descriptor; if the polling indicates that the handshake bits are mismatching, then holding processing of the master descriptor that is next in the queue for processing; and if the polling indicates that the handshake bits are matching, then enabling processing of the master descriptor that is next in the queue for processing.

In another example, the method further includes toggling the master bit in the memory when the master descriptor processing is completed. In another example, the method further includes polling the memory when a slave descriptor is next in the queue for processing, holding processing of the slave descriptor if the polling indicates that the handshake bits are mismatching, and enabling processing of the slave descriptor if the polling indicates that the handshake bits are matching. In another example, the method further includes toggling the slave bit in the memory when the slave descriptor processing is completed. In another example, the method further includes enabling a single descriptor to support a plurality of dependency pairs. In another example, the method further includes configuring the descriptors to include a one bit field to indicate that a global fence is enabled that, when set, blocks the descriptor that is next in the queue from processing unless the handshake bits are matching, and a one bit field to indicate that a local fence is enabled that, when set, blocks processing of the descriptor that is next in the queue until all preceding descriptors in the queue are processed.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A direct memory access (DMA) engine, comprising:
   one or more connections to an interconnect supporting components including a central processing unit (CPU), one or more memory devices, and one or more remote DMA engines;
   a descriptor queue for queuing descriptors that specify DMA data movement to occur among components over the interconnect; and
   a logic component configured to cause the DMA engine to perform a method comprising
     broadcasting a timestamp associated with a current descriptor to each of the remote DMA engines, the current descriptor being at a head of the descriptor queue,
     receiving timestamps associated with other descriptors from the remote DMA engines,
     comparing the timestamp of the current descriptor with the received timestamps from the remote DMA engines, and
     processing the current descriptor when the received timestamps all have ages that are younger than an age of the timestamp of the current descriptor.

2. The DMA engine of claim 1 in which timestamps are maintained in a register that provides timestamps that are unique to a set of DMA engines.

3. The DMA engine of claim 1 wherein the logic component is configured to fence the current descriptor when the timestamp of the current descriptor corresponds to a time more recent than any other received timestamps.

4. The DMA engine of claim 3 wherein the logic component is configured to set a maximum count value for a number of cycles that a descriptor has been fenced without being processed and to set an interrupt when the maximum count is reached.

5. The DMA engine of claim 1 wherein the logic component is configured to control the broadcasting using an MMIO (memory mapped input/output) register.

6. The DMA engine of claim 1 wherein the logic component is configured to locate a descriptor with a field that includes a global fence enable bit, and configured to fence the current descriptor only when its global fence enable bit is set.

7. The DMA engine of claim 6 wherein the logic component is configured to send a null descriptor when a current descriptor is fenced.

8. A method performed by a computing device, the method comprising:
   associating timestamps with descriptors, the descriptors detailing parameters for a data transfer action, and each descriptor being associated with a respective direct memory access (DMA) engine associated with the computing device;
   broadcasting, by each DMA engine having a descriptor, the associated timestamps to other DMA engines;
   comparing the broadcasted timestamps to identify a single timestamp that existed prior in time to a remainder of the timestamps; and
   performing the data transfer action for the descriptor associated with the identified single timestamp.

9. The method of claim 8, in which a DMA engine performs the data transfer action.

10. The method of claim 8, in which the DMA engines are associated with only a single processor, and the processor transmits the descriptors to the DMA engines.

11. The method of claim 8, in which:
    when the DMA engines are configured such that broadcasting timestamps is enabled, the DMA engines broadcast the timestamps; and
    when the DMA engines are configured such that broadcasting timestamps is disabled, the DMA engines broadcast a predetermined value.

12. The method of claim 8, in which each DMA engine is configured to wait until all descriptors with relatively older timestamps are completely processed before performing the data transfer action associated for the descriptor.

13. The method of claim 12, in which each DMA engine waits when the configuration to wait is enabled, and does not wait when the configuration to wait is disabled.

14. The method of claim 12, in which the DMA engines wait until local descriptors that are relatively older are completely processed.

15. The method of claim 12, in which the DMA engines wait until relatively older descriptors are completely processed for each DMA engine before processing the descriptor.

16. A system, comprising:
    a dynamic memory access (DMA) engine configured to independently transfer data;
    a single processor operatively connected to the DMA engine; and
    a timestamp register configured to associate timestamps with descriptors, wherein the DMA engine is configured to:
      receive a descriptor from the single processor, wherein the descriptor becomes enqueued for processing by the DMA engine;
      copy and store a timestamp value associated with the descriptor, wherein the timestamp value is derived from the timestamp register to indicate an order in which to process descriptors; and
      process the descriptor based on the timestamp value of the descriptor.

17. The system of claim 16, further including one or more additional DMA engines, wherein each of the DMA engines store a timestamp value derived from the timestamp register, and the timestamp register is unique to this group of DMA engines.

18. The system of claim 17, further including comparing the timestamp values to determine whether or not to process the descriptor, wherein the DMA engine processes the descriptor when the timestamp value associated with the descriptor is a relatively oldest value of all the timestamp values compared.

19. The system of claim 16, in which the timestamp register is implemented as a cycle counter.

\* \* \* \* \*